United States Patent
Hasler

(10) Patent No.: US 9,851,769 B2
(45) Date of Patent: Dec. 26, 2017

(54) METHOD FOR BALANCING A CHAIN-LINK CONVERTER IN DELTA CONFIGURATION

(71) Applicant: ABB Technology Ltd, Zürich (CH)

(72) Inventor: Jean-Philippe Hasler, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 236 days.

(21) Appl. No.: 14/900,952

(22) PCT Filed: Jul. 4, 2013

(86) PCT No.: PCT/EP2013/064177
§ 371 (c)(1),
(2) Date: Dec. 22, 2015

(87) PCT Pub. No.: WO2015/000521
PCT Pub. Date: Jan. 8, 2015

(65) Prior Publication Data
US 2016/0139643 A1    May 19, 2016

(51) Int. Cl.
*H02J 3/26* (2006.01)
*G06F 1/26* (2006.01)
(Continued)

(52) U.S. Cl.
CPC .............. *G06F 1/26* (2013.01); *H02J 3/00* (2013.01); *H02J 3/26* (2013.01); *H02M 7/44* (2013.01);
(Continued)

(58) Field of Classification Search
CPC ....... H02M 2007/4835; H02M 7/2173; H02M 5/22
See application file for complete search history.

(56) References Cited

U.S. PATENT DOCUMENTS

| 6,043,664 A * | 3/2000 | Kliman ................ G01R 31/343 324/545 |
| 9,590,483 B1 * | 3/2017 | Basic .................... H02M 1/088 |

(Continued)

FOREIGN PATENT DOCUMENTS

| CN | 101001018 A | 7/2007 |
| CN | 102130462 A | 7/2011 |

(Continued)

OTHER PUBLICATIONS

Boemer et al., "Contribution of Negative-Sequence Controlled Distributed Generation to Power System. Stability under Unbalanced Faults: A Discussion Paper", 2012 3rd IEEE PES Innovative Smart Grid Technologies Europe (ISGT Europe), Berlin, Oct. 14, 2012, pp. 1-8, see Abstract and Figure 3.

(Continued)

*Primary Examiner* — Jue Zhang
*Assistant Examiner* — Jye-June Lee
(74) *Attorney, Agent, or Firm* — Birch, Stewart, Kolasch & Birch, LLP

(57) ABSTRACT

A method for controlling a chain-link power converter including three phase legs, each of which phase legs includes a plurality of series-connected converter cells, each of the cells including a DC capacitor, the phase legs being connected in a delta configuration. The method includes detecting an unsymmetrical voltage condition at a terminal of the converter; determining a ratio between a zero sequence and a negative sequence component of a compound current to be injected into the converter, based on the detected unsymmetrical voltage condition; calculating the compound current comprising the zero sequence component and the negative sequence component in accordance with the determined ratio; and injecting the compound current (Continued)

into the converter to control the converter in view of the detected unsymmetrical voltage condition.

16 Claims, 2 Drawing Sheets

(51) Int. Cl.
*H02J 3/00* (2006.01)
*H02M 7/44* (2006.01)
*H02M 7/217* (2006.01)
*H02M 7/483* (2007.01)

(52) U.S. Cl.
CPC ........... *G05B 2219/2639* (2013.01); *G05B 2219/41294* (2013.01); *H02M 7/2173* (2013.01); *H02M 2007/4835* (2013.01); *Y02E 40/50* (2013.01)

(56) References Cited

U.S. PATENT DOCUMENTS

| | | | |
|---|---|---|---|
| 2011/0134669 A1 | 6/2011 | Yuzurihara et al. | |
| 2012/0081939 A1* | 4/2012 | Hasler | H02M 7/49 363/126 |
| 2014/0320148 A1* | 10/2014 | Sharma | G01R 31/024 324/511 |
| 2016/0308453 A1* | 10/2016 | Oates | H02M 1/08 |

FOREIGN PATENT DOCUMENTS

| | | |
|---|---|---|
| CN | 102208812 A | 10/2011 |
| CN | 102244389 A | 11/2011 |
| CN | 102522906 A | 6/2012 |
| CN | 102638049 A | 8/2012 |
| DE | 10 2010 053 638 A1 | 6/2011 |
| JP | 2000-83387 A | 3/2000 |
| JP | 2011-45210 A | 3/2011 |
| TW | 201032446 A1 | 9/2010 |
| WO | WO 99/44276 A1 | 9/1999 |
| WO | WO 2010/145706 A1 | 12/2010 |
| WO | WO 2011/088885 A1 | 7/2011 |

OTHER PUBLICATIONS

Hatano et al., "Control Scheme of Cascaded H-Bridge STATCOM Using Zero-Sequence Voltage and Negative-Sequence Current", IEEE Transactions on Power Delivery, IEEE Service Center, New York, NY, US, Apr. 1, 2010, vol. 25, No. 2, pp. 543-550, see Abstract.

Meersman et al., "The influence of grid-connected three-phase inverters on voltage unbalance", 2010 IEEE Power and Energy Society General Meeting, Minneapolis, Minnesota, USA, Jul. 25-29, 2010, IEEE, Piscataway, NJ, USA, Jul. 25, 2010, pp. 1-9.

* cited by examiner

METHOD FOR BALANCING A CHAIN-LINK CONVERTER IN DELTA CONFIGURATION

TECHNICAL FIELD

The present disclosure relates to a method and apparatus for controlling a chain-link power converter.

BACKGROUND

A power converter can be used to balance and control the phases of a three phase alternating current (AC) network.

A 2- or 3-level converter includes a common direct current (DC) capacitor used to exchange energy between all three phases. JP 2000083387 discloses a control method of a 2- or 3-level converter, in the form of a three phase inverter, in which three-phase AC is generated by alternately repeating a switching control (two-arm-on switching) in which an upper arm of a certain phase is turned on, the lower arm of the other phase is turned on, and both the upper arm and lower arm are turned off for a remaining phase among each phase of the three-phase voltage type inverter. This results in a uniform application of voltage and keeps voltage at the virtual neutral point of the delta loop at zero potential.

With a chain-link converter, each phase includes its own DC capacitors and energy transfer between phases must be done by means of an additional current or voltage. Chain-link converters do not have the flexibility to freely generate negative-sequence current as the classical 2- or 3-level converters have. The three-phase chain-link converter has three phase legs where each phase has a number of series-connected cell converters. The phase legs of series-connected cell converters can be connected either in delta or in wye (star) configuration.

For a wye-connected converter, it is possible to generate a pure positive-sequence current when the network system voltage contains a negative-sequence component, i.e., when the feeding network experiences unsymmetrical fault conditions. This is achieved by controlling the converter neutral point to a value corresponding to the negative-sequence voltage of the network.

For delta-connected converter, this is not possible since there is no real neutral point in a delta configuration. Instead, a circulating current inside the delta connection (i.e. a zero-sequence current) is used to balance the power between phase legs of the chain-link converter. A zero-sequence current is also used when the converter shall generate a negative-sequence current during balanced voltage conditions or when the system voltage is not balanced and a current shall be generated by the converter.

WO 2010/145706 discloses an arrangement for exchanging power with a three-phase electric power network comprises a voltage sourced converter (VSC) having three phase legs (A-C) with each a series connection of switching cells. The three phase legs are interconnected by forming a delta-connection. The arrangement also comprises a control unit configured to calculate a value for amplitude and phase position for a zero-sequence current for which, when circulated in the delta-connection circuit of said three phase legs, the balance of the total direct voltage of each of said three phase legs (A-C) with respect to the other two phase legs is restored will there be an unbalance and control the semiconductor devices of switching cells of the phase legs to add such a zero-sequence current to the currents of each phase leg of the converter.

SUMMARY

The magnitude of the zero-sequence to be injected inside the delta connection will depend on the output current of the power converter and on AC voltage conditions at its terminals. A potential drawback of the zero-sequence current is that the phase leg current may become unsymmetrical and it may be necessary to limit the converter current output based on the phase leg having the highest current magnitude. Furthermore, for certain AC voltage conditions, usually when the network experiences faults near to the converter, the magnitude of the zero-sequence may tend toward infinity, limiting the current output of the power converter toward zero.

Another method to balance power of the phase legs of the converter is to generate a negative-sequence current. A disadvantage of the negative-sequence current is that it will be injected into the network. Its magnitude and phase will be similar to the positive-sequence current generated by the converter. For example, if the converter shall generate a capacitive current during fault conditions to support the system voltage, then the effect of the negative-sequence current will be to increase the unbalance voltage of the network. Another disadvantage is that the phase leg currents may become unsymmetrical and maximum current output may be limited based on the phase leg having the highest magnitude.

It is an objective of the present invention to alleviate these problems with zero and negative sequence currents for balancing a power converter in delta configuration.

According to an aspect of the present invention, there is provided a method for controlling a chain-link power converter, said converter comprising three phase legs, each of which phase legs comprising a plurality of series-connected converter cells, each of the cells comprising a DC capacitor, the phase legs being connected in a delta configuration. The method comprises: detecting an unsymmetrical voltage condition at a terminal of the converter; determining a ratio between a zero sequence and a negative sequence component of a compound current to be injected into the converter, based on the detected unsymmetrical voltage condition; calculating the compound current comprising the zero sequence component and the negative sequence component in accordance with the determined ratio; and injecting the compound current into the converter to control the converter in view of the detected unsymmetrical voltage condition.

According to another aspect of the present invention, there is provided a computer program product comprising computer-executable components for causing a control apparatus to perform an embodiment of a method of the present invention when the computer-executable components are run on processor circuitry comprised in the control apparatus.

According to another aspect of the present invention, there is provided a control apparatus for controlling a chain-link power converter, said converter comprising three phase legs, each of which phase legs comprising a plurality of series-connected converter cells, each of which cells comprising a DC capacitor, the phase legs being connected in a delta configuration. The control apparatus comprises processor circuitry, and a storage unit storing instructions that, when executed by the processor circuitry, cause the apparatus to: detect an unsymmetrical voltage condition at a terminal of the converter; determine a ratio between a zero sequence and a negative sequence component of a compound current to be injected into the converter, based on the detected unsymmetrical voltage condition; calculate the compound current comprising the zero sequence component and the negative sequence component in accordance with the determined ratio; and inject the compound current into the converter to control the converter in view of the detected unsymmetrical voltage condition.

According to another aspect of the present invention, there is provided a computer program for controlling a chain-link converter, said converter comprising three phase legs, each of which phase legs comprising a plurality of series-connected converter cells, each of which cells comprising a DC capacitor, the phase legs being connected in a delta configuration. The computer program comprises computer program code which is able to, when run on processor circuitry of a control apparatus for the converter, cause the control apparatus to: detect an unsymmetrical voltage condition at a terminal of the converter; determine a ratio between a zero sequence and a negative sequence component of a compound current to be injected into the converter, based on the detected unsymmetrical voltage condition; calculate the compound current comprising the zero sequence component and the negative sequence component in accordance with the determined ratio; and inject the compound current into the converter to control the converter in view of the detected unsymmetrical voltage condition.

According to another aspect of the present invention, there is provided a computer program product comprising an embodiment of a computer program according to the present invention and a computer readable means on which the computer program is stored.

By using a compound current made up from both a zero sequence and a negative sequence component, the balancing of the phases can be better optimized and losses and reduction in current output may be minimized. The maximum current over the cells in a phase leg can be kept low even for major disturbances and unbalances. Thus, the components of the power converter such as the capacitors in the converter cells can be rated for lower currents and the cost of the converter is reduced. The converter positive-sequence current output to maintain the system voltage during fault conditions is increased/maximized. The balancing of the DC capacitors between phases is safer since the resulting compound current provides a better controllability of the DC voltage unbalance control between phases.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
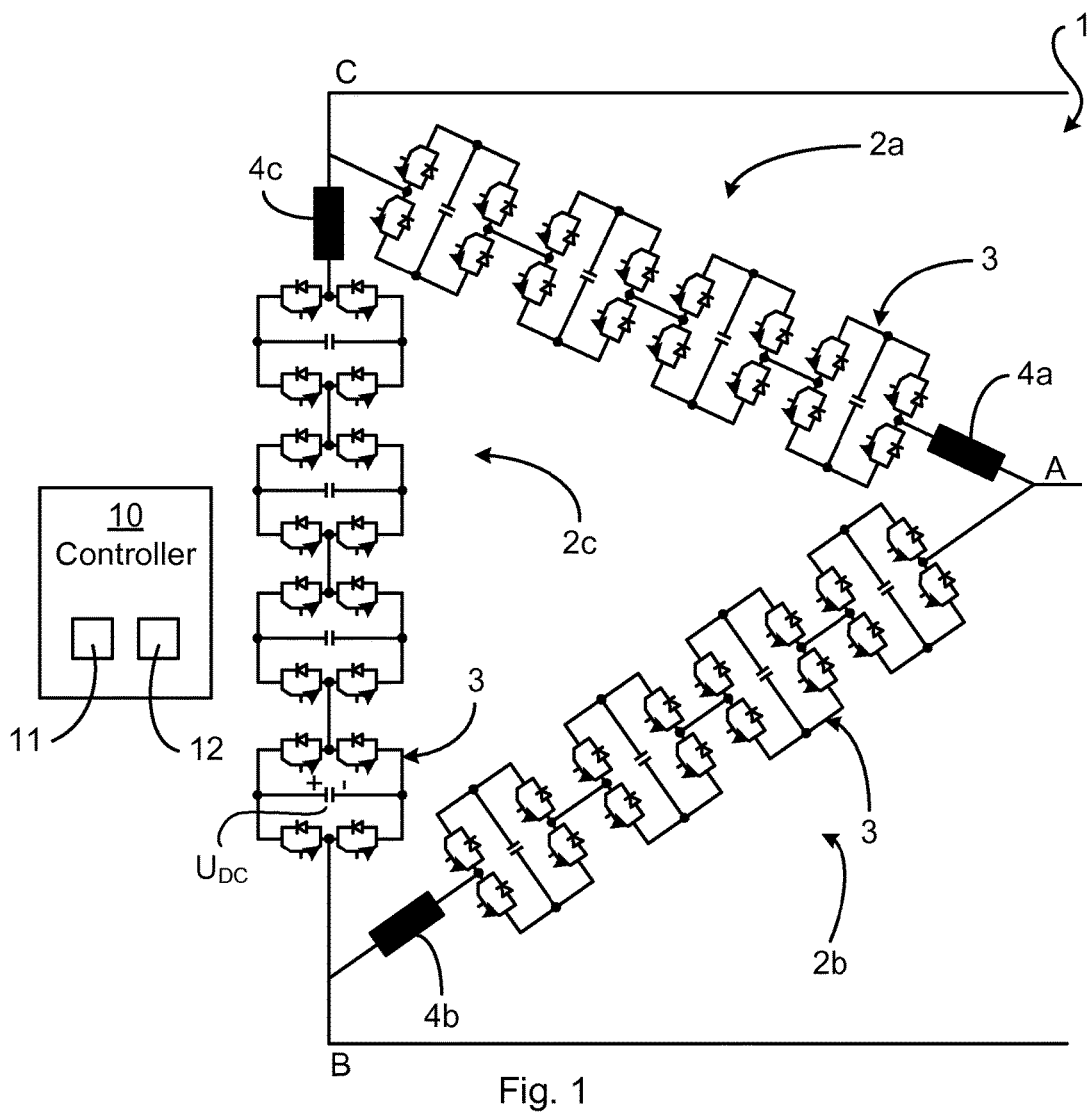
FIG. 1 is a schematic top view of an embodiment of a power converter in accordance with the present invention.

FIG. 1 schematically illustrates an embodiment of a chain-link converter 1 of the present invention. In the embodiment of FIG. 1, the chain-link converter 1 is in a delta configuration and in a full-bridge configuration. The converter 1 is configured to transform DC current to three-phase AC current. The converter 1 comprises three phase legs 2a-c. Each of the phase legs 2 comprises a plurality of series-connected converter cells 3, each comprising a DC capacitor. In one of the converter cells 3, the DC capacitor has been marked with "+" and "−" signs as well as a notation that there is a direct current $U_{DC}$. Of course, the same is relevant for all cells 3, even if not marked. Each phase leg also comprises a coil 4 for evening out the sinus wave AC constructed by the cells 3 and for controlling the current through the phase leg. Each phase leg 2 corresponds to a line A-C of the electrical network and connecting to the power converter 1 at respective terminals in the "corners" of the delta configuration. The phase legs 2 can be connected in delta-configuration, and can be in either full-bridge confirmation (as in FIG. 1) or in a half-bridge configuration. A control apparatus or controller 10 is associated with the converter 1 in order to control the operation of the converter 1 and inject the compound current discussed herein. The controller 10 comprises processor circuitry ii and a storage unit 12, as well as other circuitry which may be appropriate. In accordance with the present invention, the controller 10 balances the converter 1 by calculating and injecting a compound current into the converter 1 for optimizing the operation of the converter.

Figure 2:
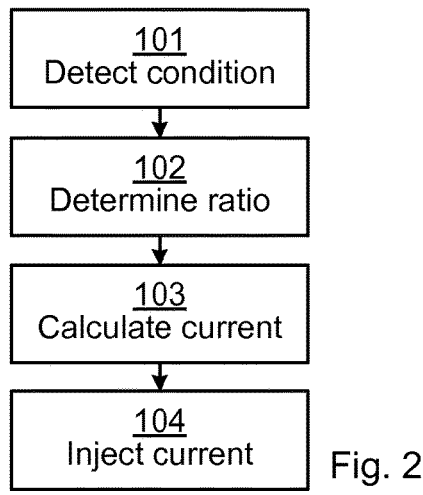
FIG. 2 is a schematic flow chart of an embodiment of a method of the present invention.

FIG. 2 is a flow chart illustrating an embodiment of the method of the present invention. An unsymmetrical voltage condition is detected 101 at a terminal of the converter 1. There may e.g. be sensors such as volt and/or current meters performing measurements at each terminal of the lines A-C, which sensors continuously or periodically reports its measurements to the control apparatus 10. The fault condition may e.g. be a one-phase or two-phase fault, e.g. resulting in voltage drop in one or two of the phases. A ratio between a zero sequence and a negative sequence component of a compound current to be injected into the converter 1 is determined 102, based on the detected 101 unsymmetrical voltage condition. Thus, the compound current comprises a negative sequence part and a zero sequence part, but these parts may not be of equal size. Rather the ratio may be determined 102 in accordance with empirical or theoretical functions using the sensor measurements as in-data for optimizing the converter operations such as maximizing the positive sequence output into the network. The compound current comprising the zero sequence component and the negative sequence component is calculated 103 in accordance with the determined 102 ratio. In this way, the compound current is obtained and made ready for injection into the converter 1. The compound current is then injected 104 into the converter 1 to control the converter in view of the detected 101 unsymmetrical voltage condition.

In some embodiments of the present invention, the method is performed by the control apparatus 10, which is connected to or comprised in the chain-link power converter 1. The control apparatus may thus be either remotely situated and controlling the converter 1 from a distance, or the control apparatus 10 may be a part of or integrated into the power converter 1.

In some embodiments of the present invention, the ratio between zero sequence current and negative sequence current is determined 102 to be within the range of 2:8 to 8:2, such as within in the range of 2:8 to 5:5. These may be convenient ranges to use for optimizing the converter. See e.g. example 7 below and FIG. 4.

In some embodiments of the present invention, the unsymmetrical voltage condition is a 1-phase fault condition (or, in other embodiments, a 2-phase-to-ground or a 2-phase-to-phase fault condition) corresponding to a voltage dip of at least 30%, such as between 40% and 80%. The present invention may be especially advantageous for large fault conditions, in which cases the phase leg current may be greatly reduced in comparison to if only zero sequence or only negative sequence current is used. See e.g. example 7 below and FIG. 4.

Figure 3:
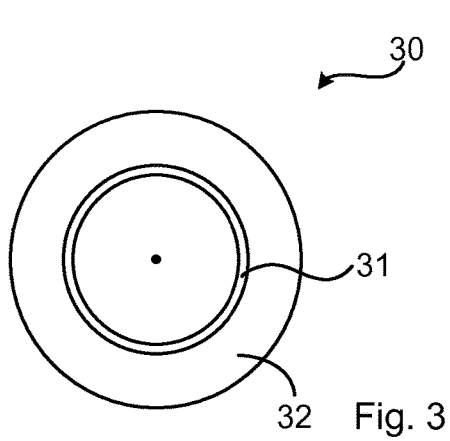
FIG. 3 is a schematic illustration of an embodiment of a computer program product of the present invention.

FIG. 3 illustrates a computer program product 30. The computer program product comprises a computer readable medium 32 comprising a computer program 31 in the form of computer-executable components 31. The computer program/computer-executable components 31 may be configured to cause a control apparatus 10, e.g. as discussed herein for controlling a power converter 1, to perform an embodiment of the method of the present disclosure. The computer program/computer-executable components may be run on the processor circuitry ii of the control apparatus 10 for causing the apparatus to perform the method. The computer program product may e.g. be comprised in the storage unit or memory 12 comprised in the apparatus 10 and associated with the processor circuitry ii. Alternatively, the computer program product 30 may be, or be part of, a separate, e.g. mobile, storage means, such as a computer readable disc, e.g. CD or DVD or hard disc/drive, or a solid state storage medium, e.g. a RAM or Flash memory.

EXAMPLES

The below examples present a feed-forward control function where a compound current comprising both zero sequence and negative sequence components in accordance with the present invention. The examples use simulation in Matlab and the function source is a Matlab m-file, which has been converted into C-code using Matlab Coder.

The FeedForward control function is part of the converter current limiter function, developed for the chain-link converter 1. The FeedForward function computes the negative sequence and zero sequence currents needed to balance the power among the phases during unbalanced operating condition. Since both negative and zero sequence currents can be used, an optimization procedure is presented in order to minimize the current flowing in the legs 2 and in order to not inject negative sequence current into the network unless it is necessary. The feed-forward compensation signals are summed with the reference currents provided by the external control and limited by the ReferenceLimiter control function.

Example 1—Function Description

The negative-sequence current ($I^-$) is computed according to Equation 1:

$$\bar{I}_{FFW}^- = -\frac{\bar{U}_{Bus}^-}{\bar{U}_C^{+'} - jx_C \cdot \bar{I}_C^{+'}} \bar{I}_C^{+'} \cdot K \quad \text{Equation 1}$$

where:
FFW stands for Feed Forward
j is a complex operator=square root of −1
$\bar{U}_{Bus}^-$ is the negative-sequence voltage at the converter bus, i.e. the secondary side of the transformer (at terminal A-B-C in FIG. 1).
$x_C$ is the converter phase reactance in power units (p.u.)
$\bar{U}_C^{+'}$ is the complex conjugate of the positive sequence voltage across the legs 2.
Please note that $\bar{U}_C^+$ is computed outside the FeedForward control function by subtracting the voltage drop across the phase reactor from the positive sequence voltage at the converter bus computed by the PLL: according to: $\bar{U}_C^+ = \bar{U}_{Bus}^+ - jx_C \cdot \bar{I}^+$
$\bar{I}_C^{+'}$ is the complex conjugate of the positive-sequence current flowing in the delta connection.
K is a control parameter which sets the amount of negative-sequence current used to balance the power. K can vary between 0 and 1, when K=1 the compensation is fulfilled by the negative-sequence current only. When K=0 the compensation is made only by the zero-sequence current and when 0<K<1 both negative and zero sequence currents are used.

The zero sequence current is computed according to Equation 2:

$$I_{FF}^0 = \frac{\frac{|\bar{U}_C|}{|\bar{U}_C^+|} \cdot e^{j\varphi_{\bar{U}}}}{\left(\frac{|\bar{U}_C|}{|\bar{U}_C^+|}\right)^2 - 1} \bar{U} - \frac{1}{\left(\frac{|\bar{U}_C|}{|\bar{U}_C^+|}\right)^2 - 1} \bar{U}' \quad \text{Equation 2}$$

where:

$$\bar{U} = -\frac{\bar{U}_C^-}{\bar{U}_C^+} \cdot \bar{I}_C^{+'} - \frac{\bar{U}_C^{+'}}{\bar{U}_C^+} \cdot \bar{I}_C^-$$

φ is the phase angle relative to the reference angle in the control system provided by the Phase Lock Loop (PLL) control.

The feed-forward currents are then summed with the reference currents, which are the outputs of the Reference-Limiter control function.

Matlab Code Description:

The Matlab code starts with the calculation of the parameter K, which is calculated according to Equation 3.

$$K = \max(K_2, (1 - K_{I0I2})) \quad \text{Equation 3}$$

Where:
$K_2$ is an input of the control function. Since in normal operation $K_{I0I2}=1$, it sets the amount of negative-sequence current to balance the power during normal or small unbalance operation.
$K_{I0I2}$ is an input of the control function and it is related to the controllability of the power unbalance through the zero-sequence current. When this parameter goes to zero it is not possible to use zero-sequence current, the overall parameter $K_{I0I2}$ goes to one and thus only the negative-sequence current is fed forward.

The parameter $K_{I0I2}$ is now further explained. The system controllability is related to the ratio between negative- and positive-sequence voltages across the phase leg 2. The same method is used in the FeedForward control function in order to set the amount of negative-sequence current used to balance the power among the phases.

The Matlab code starts by computing:

$$a_{10} = \begin{cases} 1 - \frac{|\overline{U_C}|^2}{|\overline{U_C^+}|^2} & \text{if } |\overline{U_C^+}| > 0.1 \\ 0 & \text{else} \end{cases}$$

When $a_{10}$ approaches zero, the dc voltage is not controllable by the zero-sequence current. In order to avoid sudden fluctuations of the control parameter, a limit is applied, and then the resulting signal is processed by a low-pass filter.

Starting from $a_{10}$, the parameter $K_{I0}$ is computed according to the following equation, whose coefficients are hard-coded in the Matlab file.

$$K_{I0} = \begin{cases} 0 & \text{if } a_{10} \leq 0.6 \\ \frac{a_{10} - 0.6}{0.3} & \text{if } 0.6 < V \leq 0.9 \\ 1 & \text{if } a_{10} > 0.9 \end{cases}$$

The signal $K_{I0}$ is then filtered, the output is $K_{I0I2}$ (below also called $K_{I0F}$).

$$K_{I0} \rightarrow \boxed{\frac{1}{1+s\tau}} \rightarrow K_{I0F}$$

Where:

$$\tau = \frac{T_S(1-k)}{k} \approx 5 \text{ ms}$$

based on a sampling time $T_S=100$ μs (50 Hz system) and a hard-coded value of k=0.02.

The parameter $K_{I0I2}$ is thus used to select the dc voltage controller.

Once the parameter K is known it is possible to compute the negative-sequence current according to Equation 4

$$\overline{I}_{FFL}^- = $$

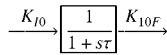

$$\begin{cases} -\frac{\overline{U}_{Bus}^-}{\overline{U}_C^{+'} - jx_C \cdot \overline{I}_C^{+'}} \overline{I}_C^{+'} \cdot K + \overline{I}_C^- \cdot K_{I0I2} & \text{if } |\overline{U}_C^{+'} - jx_C \cdot \overline{I}_C^{+'}| > 0.01 \\ 0 & \text{else} \end{cases}$$ Equation 4 where:

$\overline{I}_C^-$ is the negative-sequence current reference provided by the ReferenceLimiter control function.

Once the negative-sequence current is known, it is possible to compute the negative-sequence voltage across the legs 2:

$$\overline{U}_C^- = \overline{U}_{Bus}^- - jx_C \cdot \overline{I}_{FFL}^-$$ Equation 5

If the positive-sequence voltage across the legs 2 (also called the valve) is greater than 0.01 p.u. it is possible to compute the zero-sequence current according to Equation 2. Before that it is necessary to check come parameters in order not to divide by zero:

$$I_{temp}^0 = \begin{cases} \frac{1}{\left(\frac{|\overline{U_C}|}{|\overline{U_C^+}|}\right)^2 - 1}\left(\frac{|\overline{U_C}|}{|\overline{U_C^+}|} \cdot e^{j\varphi_{\overline{U}}}\overline{U} - \overline{U}'\right) & \text{if } \left(\frac{|\overline{U_C}|}{|\overline{U_C^+}|}\right)^2 < 0.8 \\ \frac{1}{0.8-1}\left(\frac{|\overline{U_C}|}{|\overline{U_C^+}|} \cdot e^{j\varphi_{\overline{U}}}\overline{U} - \overline{U}'\right) & \text{if } \left(\frac{|\overline{U_C}|}{|\overline{U_C^+}|}\right)^2 \geq 0.8 \end{cases}$$ Equation 6

Besides, a check on the value of the parameter K in order to avoid to use zero-sequence when not needed.

$$I_{FF}^0 = \begin{cases} I_{temp}^0 & \text{if } K < 0.98 \\ 0 & \text{if } K \geq 0.98 \end{cases}$$ Equation 7

Then, the output signals are generated:

$$\overline{I}_S^+ = \overline{I}_C^+$$

$$\overline{I}_S^- = \overline{I}_{FFL}^-$$

$$\overline{I}_S^0 = \overline{I}_{FF}^0$$ Equation 8

Input Signals

| Name | Unit | Symbol | Comment |
|---|---|---|---|
| uPosC | p.u. | $\overline{U}_C^+$ | Positive-sequence voltage vector across the valve |
| uNeg | p.u. | $\overline{U}_{Bus}^-$ | Negative-sequence voltage vector at the converter bus |
| iPos | p.u. | $\overline{I}_C^+$ | Positive-sequence current reference vector |
| iNeg | p.u. | $\overline{I}_C^-$ | Negative-sequence current reference vector |
| iZero | p.u. | $\overline{I}^0$ | Zero-sequence current reference vector |
| xc | p.u. | $x_C$ | Converter phase reactance |
| K2 | | $K_2$ | iNeg/iZero ratio in normal operation |
| Ts | ms | $T_s$ | Process sampling time, signal not used in the function |
| FLICKER | Logical | | Flicker control active, signal not used in the function |
| KI0I2 | | $K_{I0I2}$ | If '1' → power balanced through zero-sequence current. If '0' → power balanced through negative-sequence current. |

Output Signals

| Name | Unit | Symbol | Comment |
|---|---|---|---|
| iPosS | p.u. | $\overline{I}_S^+$ | Total positive-sequence current reference vector |
| iNegS | p.u. | $\overline{I}_S^-$ | Total negative-sequence current reference vector |
| iZeroS | p.u. | $\overline{I}_S^0$ | Total zero-sequence current vector |
| iNegFF [1] | p.u. | | Feed-forward negative-sequence current vector |

-continued

| Name | Unit | Symbol | Comment |
|---|---|---|---|
| I0FF [1] | p.u. | | Feed-forward zero-sequence current vector |
| Kmax [1] | | K | iNeg/iZero ratio |
| KI2 [1] | | $K_{I2}$ | Controllability of dc voltage unbalance means of zero-sequence current |

[1] Used only for debugging purposes.

Example 2

The Matlab function Test_FeedForward.m is provided to test the FeedForward.m function. In order to run Test_FeedForward.m both the CRC_FeedForward.m and FeedForward.m Matlab functions are needed.

The function simulates the following sequence:

Step the positive-sequence voltage to 1 p.u. @ t=20 ms

Simulate an event @ t=150 ms:

Case 0. Balanced operation. The positive-sequence voltage is constant and does not change during the simulation Case 1. Unbalanced operation due to mix of positive- and negative-sequence voltages.

Case 2. Unbalanced operation due to mix of positive- and negative-sequence voltages, this case represents a bolted phase to phase fault at the primary side of a Yd transformer.

Case 3. Unbalanced operation. The negative-sequence voltage increases from zero to 0.4 p.u., and at the same time the positive-sequence voltage decreases from one to 0.6 p.u.

The event is cleared @ t=300 ms

The positive-sequence current has been set to 0.2 p.u. during all the simulation and the sampling time is 100 µs.

Example 3—Balanced Operation

During balanced operation, the feed-forward is disabled, thus both the negative- and zero-sequence currents are zero. The phase to phase voltages are balanced at 120° angle to each other. For the DC-voltages, the signals are constant except for the instant in which the system starts to operate.

Example 4—Unbalanced Operation

The unbalance operation is caused by the presence of positive- and negative-sequence voltages between t=150 ms and t=300 ms. In this period of time, zero-sequence current is generated in order to keep the DC-voltages constant. The negative-sequence current in this operating condition is zero, why only zero sequence current is used. The filtered DC-voltages are constant during the simulation. They change only when disturbances occur, i.e. when the control starts to operate, when the fault occurs and when the fault is cleared.

Example 5—Bolted Two-Phase Fault

In this case the behaviour of the control function is almost the same as in example 4. The difference is that now the amount of negative-sequence voltage is not equal to zero. Moreover, at about t=0.175 ms, the control parameter becomes one, and thus the compensation is fulfilled by the negative-sequence only.

Example 6—Ramp Response

In this test the positive-sequence voltage is decreased to 0.6 p.u. while the negative-sequence voltage is increased to 0.4 p.u. The aim of this test is to check that the zero- and negative-sequence currents increase together with the unbalance of the system. Moreover, it is possible to test the computation of the parameter controls $K_{I2}$ and K. Until t=0.23 ms the negative-sequence voltage is not that high and the zero-sequence current is enough to balance the power. Starting from t=0.23 ms the parameter steps to zero and both negative- and zero-sequence currents are used to compensate the power among the phases.

Example 7

Figure 4:
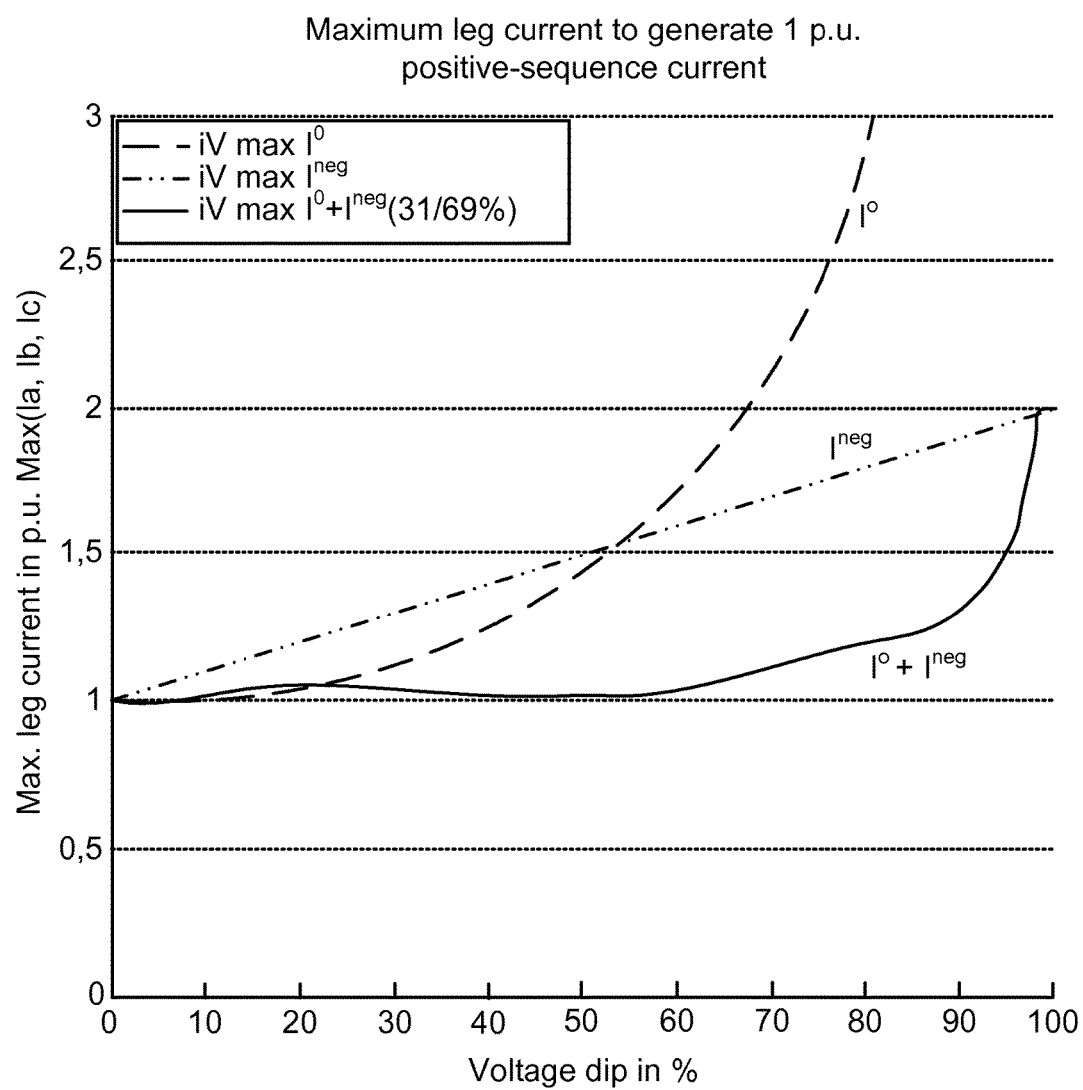
FIG. 4 is a simulation example graph showing the phase leg current at different voltage dips for different control currents.

FIG. 4 shows the maximum phase leg current (iV max) in the power converter 1 for different magnitudes of a voltage dip simulating a 1-phase fault condition in the network.

Maximum converter phase leg current magnitude when the positive-sequence current output of the converter 1 is 1.0 p.u. for 1-phase to ground fault in the feeding network. The x-axis is the voltage dip of the faulty phase.

"Exponential" dashed curve: Maximum phase leg current when only zero-sequence current ($I^o$) is used.

"Proportional" dashed/dotted curve: Maximum phase leg current when only negative-sequence current ($I^-$) is used.

Bottom, solid curve: Maximum phase leg current with compound current; comprising 31% zero sequence current and 69% negative sequence current.

As is evident from FIG. 4, the compound current results in a substantial and surprising reduction in phase leg current, even for very high voltage dips. Regardless of the magnitude of the voltage dip, the compound current always results in the lowest phase leg current.

Below follows another aspect of the present invention.

According to an aspect of the present invention, there is provided a control apparatus (10) for controlling a chain-link power converter (1), said converter comprising three phase legs (2), each of which phase legs comprising a plurality of series-connected converter cells (3), each of which cells comprising a DC capacitor, the phase legs (2) being connected in a delta configuration. The control apparatus comprises: means (11) for detecting (101) an unsymmetrical voltage condition at a terminal of the converter (1); means (11) for determining (102) a ratio between a zero sequence and a negative sequence component of a compound current to be injected into the converter (1), based on the detected (101) unsymmetrical voltage condition; means (11) for calculating (103) the compound current comprising the zero sequence component and the negative sequence component in accordance with the determined (102) ratio; and means (11) for injecting (104) the compound current into the converter (1) to control the converter in view of the detected (101) unsymmetrical voltage condition.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method for controlling a chain-link power converter, said converter comprising three phase legs, each of which phase legs comprising a plurality of series-connected converter cells, each of the cells comprising a DC capacitor, the phase legs being connected in a delta configuration, the method comprising: detecting an unsymmetrical voltage condition at a terminal of the converter; determining a ratio between a zero sequence and a negative sequence component of a compound current to be injected into the converter, wherein an amount of the negative sequence component is not zero, based on the detected unsymmetrical voltage condition; calculating the compound current comprising the zero sequence component and the negative sequence component in accordance with the determined ratio; and injecting the compound current into the converter to control the converter in view of the detected unsymmetrical voltage condition.

2. The method of claim 1, wherein the method is performed by a control apparatus connected to or comprised in the chain-link power converter.

3. The method of claim 2, wherein the ratio between zero sequence current and negative sequence current is determined to be within the range of 2:8 to 8:2.

4. The method of claim 2, wherein the determining a ratio comprises determining an amount of negative sequence current in the compound current set by the variable K, 0<K<1, where K is calculated according to equation 3: K=max(K.sub.2,(1−K.sub.I0I2)) Equation 3.

5. The method of claim 1, wherein the ratio between zero sequence current and negative sequence current is determined to be within the range of 2:8 to 8:2.

6. The method of claim 2, wherein the unsymmetrical voltage condition is a 1-phase, a 2-phase-to-ground or a 2-phase-to-phase fault condition corresponding to a voltage dip of at least 30%.

7. The method of claim 5, wherein the unsymmetrical voltage condition is a 1-phase, a 2-phase-to-ground or a 2-phase-to-phase fault condition corresponding to a voltage dip of at least 30%.

8. The method of claim 5, wherein the determining a ratio comprises determining an amount of negative sequence current in the compound current set by the variable K, 0<K<1, where K is calculated according to equation 3: K=max(K.sub.2,(1−K.sub.I0I2)) Equation 3.

9. The method of claim 1, wherein the unsymmetrical voltage condition is a 1-phase, a 2-phase-to-ground or a 2-phase-to-phase fault condition corresponding to a voltage dip of at least 30%.

10. The method of claim 9, wherein the determining a ratio comprises determining an amount of negative sequence current in the compound current set by the variable K, 0<K<1, where K is calculated according to equation 3: K=max(K.sub.2,(1−K.sub.I0I2)) Equation 3.

11. The method of claim 1, wherein the determining a ratio comprises determining an amount of negative sequence current in the compound current set by the variable K, 0<K<1, where K is calculated according to equation 3: K=max(K.sub.2,(1−K.sub.I0I2) Equation 3.

12. A computer program product comprising a non-transitory computer-readable storage medium having computer-executable components for causing a control apparatus to perform the method of claim 1 when the computer-executable components are run on processor circuitry comprised in the control apparatus.

13. The method of claim 1, wherein the ratio between zero sequence current and negative sequence current is determined to be within the range of 2:8 to 5:5.

14. The method of claim 1, wherein the unsymmetrical voltage condition is a 1-phase, a 2-phase-to-ground or a 2-phase-to-phase fault condition corresponding to a voltage dip of between 40% and 80%.

15. A control apparatus for controlling a chain-link power converter, said converter comprising three phase legs, each of which phase legs comprising a plurality of series-connected converter cells, each of which cells comprising a DC capacitor, the phase legs being connected in a delta configuration, the control apparatus comprising: processor circuitry; and a storage unit storing instructions that, when executed by the processor circuitry, cause the apparatus to: detect an unsymmetrical voltage condition at a terminal of the converter; determine a ratio between a zero sequence and a negative sequence component of a compound current to be injected into the converter, wherein an amount of the negative sequence component is not zero, based on the detected unsymmetrical voltage condition; calculate the compound current comprising the zero sequence component and the negative sequence component in accordance with the determined ratio; and inject the compound current into the converter to control the converter in view of the detected unsymmetrical voltage condition, wherein the control apparatus is integrated in the chain-link power converter.

16. A non-transitory computer-readable storage medium having stored thereon a computer program for controlling a chain-link converter, said converter comprising three phase legs, each of which phase legs comprising a plurality of series-connected converter cells, each of which cells comprising a DC capacitor, the phase legs being connected in a delta configuration, the computer program comprising computer program code which is able to, when run on processor circuitry of a control apparatus for the converter, cause the control apparatus to:
 detect an unsymmetrical voltage condition at a terminal of the converter;
 determine a ratio between a zero sequence and a negative sequence component of a compound current to be injected into the converter, wherein an amount of the negative sequence component is not zero, based on the detected unsymmetrical voltage condition;
 calculate the compound current comprising the zero sequence component and the negative sequence component in accordance with the determined ratio; and
 inject the compound current into the converter to control the converter in view of the detected unsymmetrical voltage condition.

* * * * *